(12) United States Patent
Brown

(10) Patent No.: US 6,978,469 B2
(45) Date of Patent: Dec. 20, 2005

(54) DISC PROTECTOR

(76) Inventor: Johnny L. Brown, 3117 28th Parkway, Temple Hills, MD (US) 20748

( * ) Notice: Subject to any disclaimer, the term of this patent is extended or adjusted under 35 U.S.C. 154(b) by 91 days.

(21) Appl. No.: 10/424,535

(22) Filed: Apr. 25, 2003

(65) Prior Publication Data

US 2004/0205806 A1 Oct. 14, 2004

Related U.S. Application Data

(60) Provisional application No. 60/428,945, filed on Nov. 25, 2002.

(51) Int. Cl.[7] ............................................... G11B 7/24
(52) U.S. Cl. ................................................. 720/719
(58) Field of Search ....................... 720/719; 428/42.1; 427/372.2; 252/504; 156/541; 369/275.5

(56) References Cited

U.S. PATENT DOCUMENTS

| | | | | |
|---|---|---|---|---|
| 4,879,710 A | * | 11/1989 | Iijima | .......................... 720/719 |
| 4,900,392 A | * | 2/1990 | Bradshaw et al. | .......... 156/541 |
| 4,983,437 A | * | 1/1991 | Merrick | ..................... 428/42.1 |
| 5,293,370 A | * | 3/1994 | Beauchamp et al. | ..... 369/275.5 |
| 6,262,969 B1 | * | 7/2001 | Ito et al. | ...................... 720/719 |
| 6,385,164 B1 | * | 5/2002 | Winicki | ....................... 720/719 |
| 6,613,417 B1 | * | 9/2003 | Banzai | .................... 427/372.2 |
| 6,695,984 B1 | * | 2/2004 | Odaka et al. | ............... 252/504 |

\* cited by examiner

*Primary Examiner*—Tianjie Chen
(74) *Attorney, Agent, or Firm*—Law Offices of Royal W. Craig

(57) ABSTRACT

An optical media disc protector comprising a transparent plastic disc formed in a substantially circular configuration with a center-hole, and a temporary adhesive applied to one side of said plastic disc for removable bonding with a media disc. The laser of a conventional player can read the contents of the optical disk through the disc protector.

In one embodiment, water-soluble adhesive is applied to one side of the optical media disc protector, such as in an inner ring around the center-hole, and a peripheral outer ring.

In another embodiment, the transparent plastic disc is formed in a substantially circular configuration with a center-hole and a plurality of axial tabs protruding from about its periphery. Temporary pressure-sensitive adhesive is applied to one side of each of the tabs.

In both cases a removable backing may be supplied to protect the adhesive until application. Both embodiments are used by removing the backing and applying the disc protector to cover the read side of the optical media, using the temporary adhesive to bond. If a disc protector is damaged, it can easily be removed and replaced.

1 Claim, 3 Drawing Sheets

DISC PROTECTOR

CROSS-REFERENCE TO RELATED INVENTION(S)

The present application derives priority from U.S. Provisional Patent Application No. 60/428,945, filed 25 Nov. 2002.

BACKGROUND OF THE INVENTION

1. Field of the Invention

The present invention relates to compact discs (CDs) and digital video discs (DVDs), and more particularly, to a scratch protector for CDs and DVDs that does not inhibit playback of the information stored on the disc.

2. Description of the Background

A common problem with CDs and DVDs is that the surface of the disc may be easily scratched and marred from repeated handling and dropping, etc. When the surface of the disc is scratched, the disc tends to skip when it is read by a laser in a CD or DVD player. Some discs are inadvertently damaged so badly that they can no longer be read by a CD and/or DVD player. When a scratched or marred CD/DVD disc is no longer readable, the disc is usually thrown away because it is useless.

Accordingly, there is a need in the art for a new and improved apparatus and method for protecting the read surface of CDs and DVDs.

SUMMARY OF THE INVENTION

It is an object of the present invention to provide a new and improved apparatus and method for protecting the read surface of CDs, DVDs, and all optical disc storage media.

In accordance with the foregoing object, an optical media disc protector and method of use are provided. The disc protector comprises a rigid transparent plastic disc formed in a substantially circular configuration with a center-hole, and a temporary adhesive applied to one side of said plastic disc for removable bonding with a media disc.

In one embodiment, water-soluble adhesive is applied to one side of the optical media disc protector, such as in an inner ring around the center-hole, and a peripheral outer ring. A protective removable backing may be supplied over the temporary adhesive to protect it until application. This embodiment is used by removing the backing and applying the disc protector to cover the read side of the optical media, using the temporary adhesive to bond, thereby shielding the read side. The laser of a conventional player can read the contents of the optical disk through the disc protector. The disc protector absorbs any nicks or scrapes that would otherwise affect the performance of the disc. If the disc protector is damaged, it can be removed from the optical media by immersion in water.

In another embodiment, the transparent plastic disc is formed in a substantially circular configuration with a center-hole and a plurality of axial tabs protruding from about its periphery. The temporary pressure-sensitive adhesive is applied to one side of each of the tabs, and a removable backing may be supplied to protect the adhesive until application. This embodiment is used by removing the backing and applying the disc protector to cover the read side of the optical media, folding the tabs over the media and using the temporary adhesive to bond the disc protector thereto, thereby shielding the read side. Again, the laser of a convention player can read the contents of the optical disk through the disc protector. If the disc protector is damaged, it can be removed from the optical media by unhooking the temporary-adhesive tabs.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

The present invention is a new and improved apparatus and method for protecting the read surface of CDs, DVDs, and all optical disc storage media.

Figure 1:
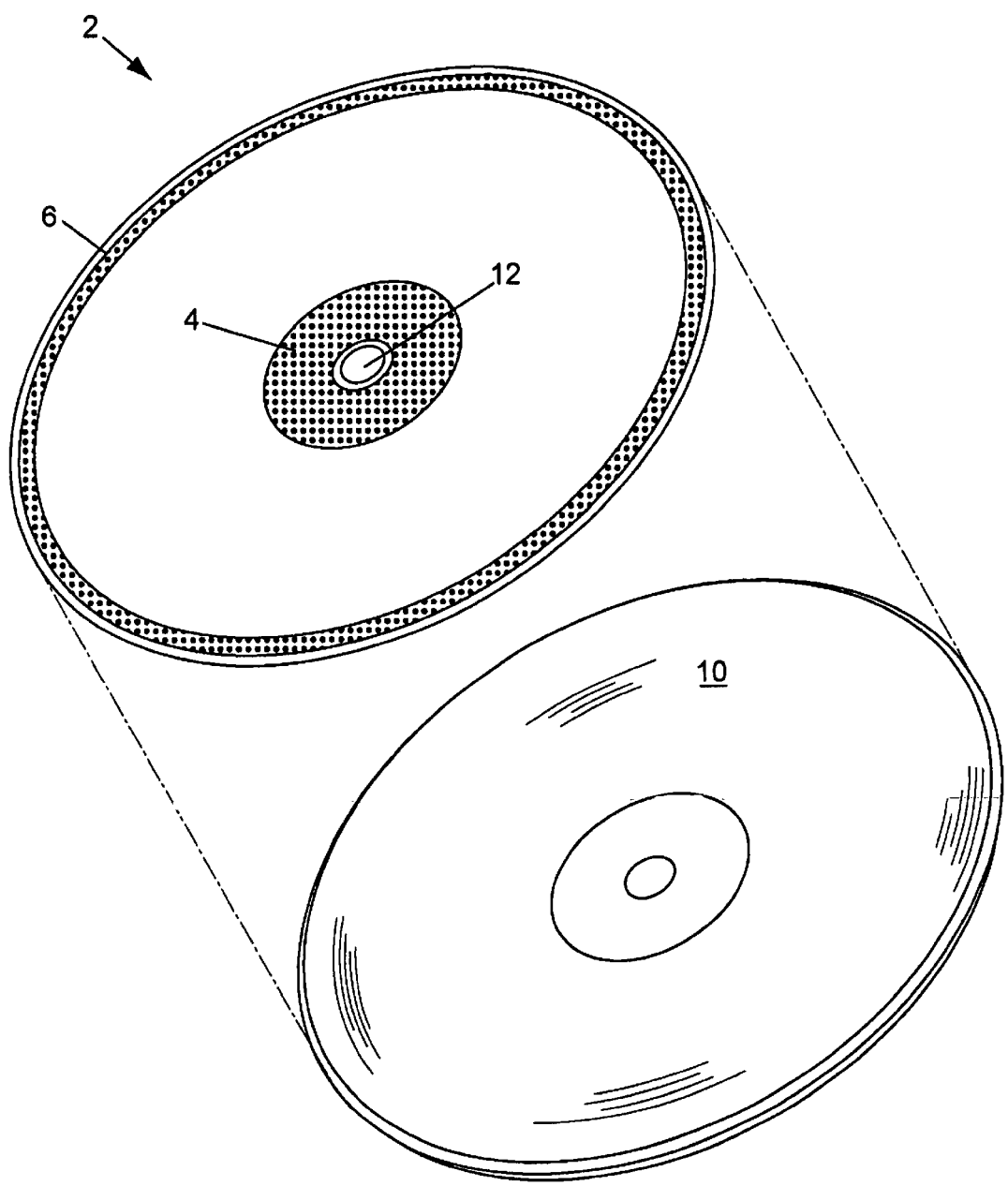
FIG. 1 is a perspective view of a disc protector 2 in accordance with a first embodiment of the present invention.
Figure 2:
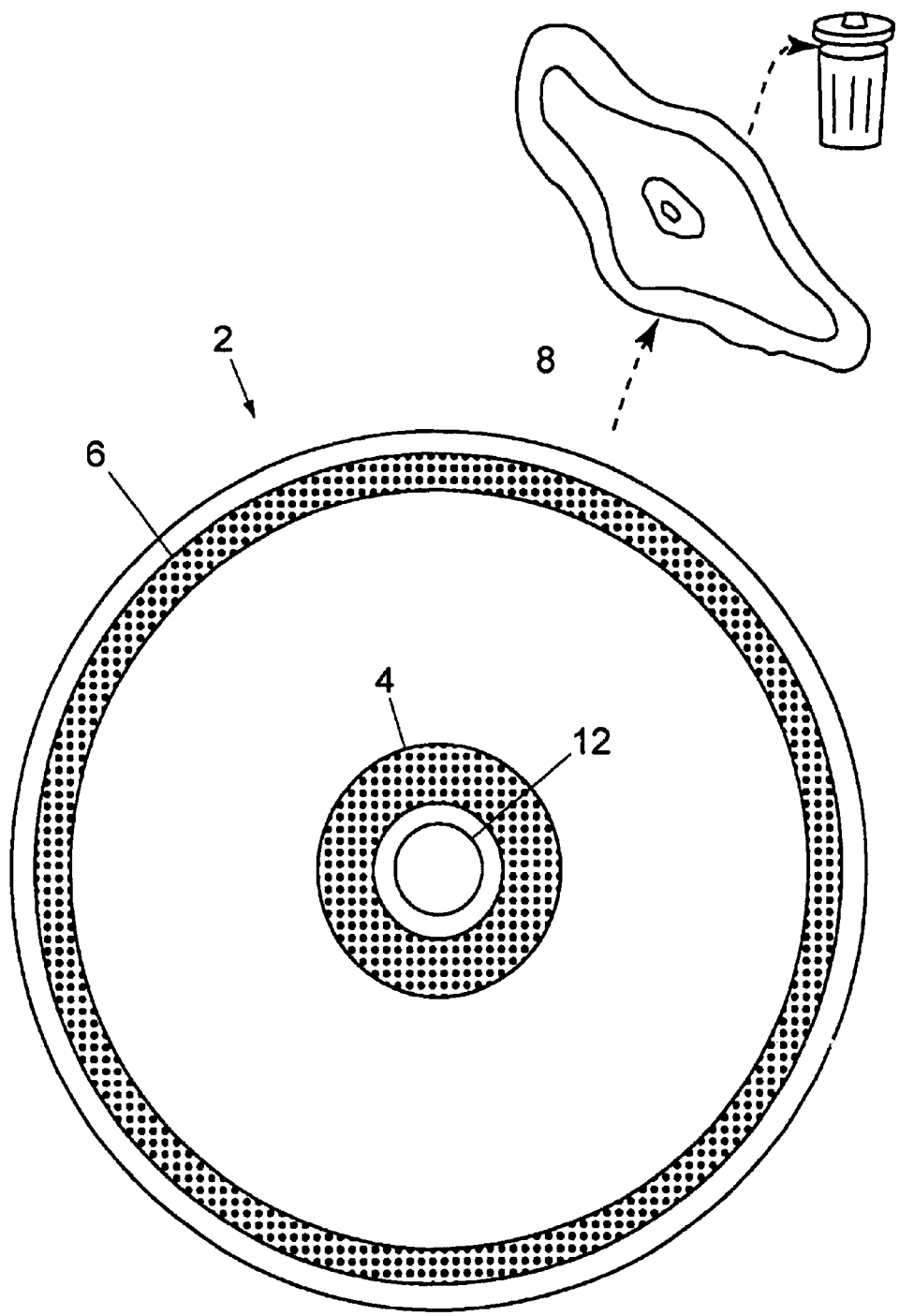
FIG. 2 is a front view of the disc protector 2 of FIG. 1.

As shown in FIG. 1, the present invention comprises a transparent protective cover 2 for the read surface 10 of a conventional CD, DVD or other optical storage media. The transparent cover 2 is preferably formed of plastic, however, other materials such as scratch resistant glass may be used and still fall within the spirit and scope of the present invention. Rigid transparent plastic material is suitable such as polycarbonate, acrylic or other of various polymers.

The protective cover 2 is circular and substantially identical in size to a CD/DVD except it is preferably half the thickness of the CD/DVD. Conventional CD and DVDs have a substrate diameter of 120 mm, and a thickness of 1.2 mm. Thus, the protective cover 2 is approximately 120 mm wide and 0.6 mm thick. At this thickness, the protective cover 2 will not inhibit the ability of the CD or DVD to be read in an appropriate player. Moreover, the transparent properties of the cover 2 enable the laser to still be able to read the information stored on the disc. The protective cover 2 is formed with a center hole 12 corresponding to that of the disc.

The protective cover 2 is preferably removable so that if the protective cover becomes scratched or marred to the point that the disc skips or is no longer readable, the protective cover is damaged and not the actual CD/DVD. A new protective cover 2 can then be applied to the disc.

The present invention contemplates two methods for applying the removable protective cover 2 to a disc, as discussed in more detail below. However, other methods for applying and removing the disc may be contemplated in the future and still fall within the spirit and scope of this invention.

According to a first embodiment, the protective cover 2 is applied to the read side 10 of the CD/DVD with an adhesive 4, 6, which is preferably a transparent water soluble adhesive. A variety of suitable water soluble transparent adhesives are commercially available, water dispersed polyurethane resin being one example. The protective cover 2 may be manufactured with the water soluble adhesive 4, 6 spread over the side of the protective cover 2 that will face the read side 10 of the disc. Particularly, a first ring of adhesive 4 may be placed around the center hole 12, and a second ring of adhesive 6 may be placed continuously or at multiple points around the outer circumference of the protective cover 2.

The protective cover 2 may further include a thin plastic film backing that covers the adhesive until the user is ready to apply the cover to a disc, similar to a self-adhesive postage stamp. Once the adhesive surfaces 4, 6 are exposed, the protective cover 2 is gently pressed together with the disc. For ease of use and accuracy, either the protective cover 2 or the disc may be placed in a disc holder or jewel case while the other component is pressed against it. This method leaves little room for error when aligning the center holes on the components.

In use, when a protected CD/DVD becomes scratched or marred to the point that it is no longer readable by a CD/DVD player, it is relatively easy to replace the damaged protective cover 2. The protected CD/DVD is simply placed in water, which dissolves the water soluble adhesive 4, 6. After the adhesive is completely dissolved, the protective cover separates from the disc. The old cover 2 may simply be thrown away. Once the disc is rinsed and dried, a new protective cover 2 may be applied to the read side of the disc.

Figure 3:
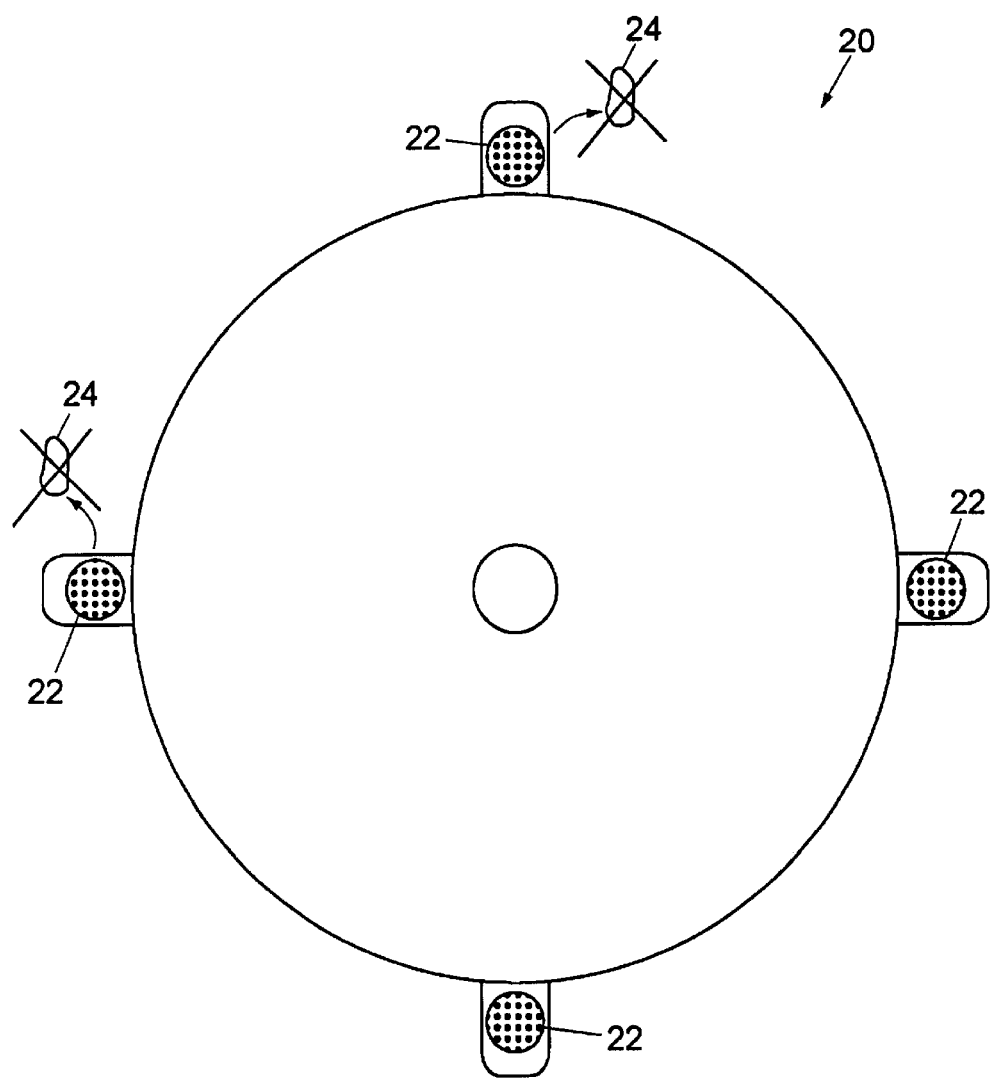
FIG. 3 is a front view of a disc protector 20 in accordance with an alternative embodiment of the present invention.

In a second embodiment for applying a protective cover to a disc, temporary adhesive strips 22 are provided on the protector 20 to hold the protector 20 against the disc, as shown in FIG. 3. The adhesive strips 22 for this method need not be water-soluble. Rather, they can be any type of removable adhesive strips such as 3M™ brand Removable Repositionable Tape strips. While four adhesive strips 22 are shown, the present invention contemplates that any number of adhesive strips 22 may be used. The adhesive strips are affixed to the protective cover 20 and have a plastic film or paper backing 24 that may be peeled away to expose the adhesive. The strips 22 are pulled over the top of the disc and gentle pressure is applied to ensure that the adhesive strips 22 are in contact with the disc. The adhesive strips 22 are preferably long enough to wrap over the edge of the disc but short enough to keep from interfering with the read side of the disc. As before, a disc holder (or jewel case) may be used for accuracy when aligning the disc and the protective cover.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims:

I claim:

1. An optical media disc protector, comprising a transparent plastic disc and a temporary pressure-sensitive adhesive applied to said plastic disc for removable bonding with a media disc, said transparent plastic disc being formed in a substantially circular configuration with a center-bole and a plurality of axial tabs protruding from its periphery, and said temporary pressure-sensitive adhesive being applied to one side of each of said tabs.

* * * * *